United States Patent
Noguchi et al.

(10) Patent No.: US 7,927,692 B2
(45) Date of Patent: *Apr. 19, 2011

(54) CARBON FIBER COMPOSITE MATERIAL AND PROCESS FOR PRODUCING THE SAME

(75) Inventors: Toru Noguchi, Nagano (JP); Shigeru Fukazawa, Nagano (JP); Shuichi Shimizu, Nagano (JP)

(73) Assignee: Nissin Kogyo Co., Ltd., Ueda-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/836,305

(22) Filed: Jul. 14, 2010

(65) Prior Publication Data

US 2010/0279099 A1 Nov. 4, 2010

Related U.S. Application Data

(63) Continuation of application No. 10/821,175, filed on Apr. 9, 2004, now Pat. No. 7,785,701.

(30) Foreign Application Priority Data

| Apr. 9, 2003 | (JP) | 2003-105294 |
| May 28, 2003 | (JP) | 2003-150164 |
| Sep. 2, 2003 | (JP) | 2003-309932 |
| Apr. 7, 2004 | (JP) | 2004-113469 |

(51) Int. Cl.
*B32B 13/02* (2006.01)
(52) U.S. Cl. ............... 428/297.4; 428/299.1
(58) Field of Classification Search ............... 428/297.4, 428/299.1, 367, 408; 524/495, 496
See application file for complete search history.

(56) References Cited

U.S. PATENT DOCUMENTS

| 3,595,054 A | 7/1971 | Sendzimir |
| 5,844,523 A | 12/1998 | Brennan et al. |
| 6,203,814 B1 | 3/2001 | Fisher et al. |
| 7,438,971 B2 * | 10/2008 | Bryant et al. ............... 428/300.7 |
| 7,619,029 B1 * | 11/2009 | Noguchi et al. ............... 524/495 |
| 7,758,962 B2 * | 7/2010 | Magario et al. ............... 428/408 |
| 2002/0090330 A1 | 7/2002 | Smalley et al. |
| 2003/0096104 A1 | 5/2003 | Tobita et al. |
| 2010/0279099 A1 * | 11/2010 | Noguchi et al. ............. 428/297.4 |

FOREIGN PATENT DOCUMENTS

| JP | 01-289843 | 11/1989 |
| JP | 02-298530 | 12/1990 |
| JP | 08-127674 | 5/1996 |
| JP | 2002-273741 | 9/2002 |

(Continued)

OTHER PUBLICATIONS

Noguchi et al., "Structure and Properties for Carbon Nanofiber/Elastomer Nanocomposites," Sep. 10, 2003, 52d SPSJ Symposium on Macromolecules, pp. 1785-1786, (with English-language translation of relevant portions).

(Continued)

*Primary Examiner* — N. Edwards
(74) *Attorney, Agent, or Firm* — Oliff & Berridge, PLC (57) ABSTRACT

The present invention provides a carbon fiber composite material comprising an elastomer and a carbon nanofiber dispersed in the elastomer, wherein the elastomer has an unsaturated bond or a group, having affinity to the carbon nanofiber. Also disclosed is a process for producing the carbon fiber composite material.

14 Claims, 7 Drawing Sheets

FOREIGN PATENT DOCUMENTS

| | | |
|---|---|---|
| JP | 2003-113272 | 4/2003 |
| JP | 2003-342480 | 12/2003 |
| JP | 2004-210830 | 7/2004 |
| WO | WO 90/10296 | 9/1990 |
| WO | WO 90/12842 | 11/1990 |
| WO | WO 95/07316 | 3/1995 |
| WO | WO 02/076888 | 10/2002 |
| WO | WO 03/050181 A1 | 6/2003 |
| WO | WO 03/060002 A1 | 7/2003 |

OTHER PUBLICATIONS

T. Noguchi, "Carbon Nanotube/Aluminium Composites with Uniform Dispersion," Feb. 20, 2004, Materials Transactions, No. 2, vol. 45, pp. 602-604, (with English-language translation of relevant portions).

Kita et al., "High-Brightness Electron Emission from Flexible Carbon Nanotube/Elastomer Nanocomposite Sheets," 2006 Japan Society of Applied Physics, vol. 45, No. 44, 2006, pp. L1186-L1189.

Kongo-Konren Gijutsu, Mixing Methods, p. 218, Tokyo: The Association of Powder Process Industry and Engineering, Japan, Nikkan Kogyo Shimbun Ltd., Aug. 20, 1980.

Mar. 11, 2010 Office Action issued in Chinese Application No. 200910150265.9.

Bokobza, "Multiwall carbon nanotube elastomeric composites: A review," ScienceDirect, Polymer 48 (2007), published 2007, pp. 4907-4920, Elsevier, Ltd., Paris, France.

Nakamura et al., "Side electron emission device using carbon nanofiber/elastomer composite sheet," Applied Physics Letters 92, 243302 (2008), published online Jun. 17, 2008, 3 pages.

Endo et al., "Extreme-Performance Rubber Nanocomposites for Probing and Excavating Deep Oil Resources Using Multi-Walled Carbon Nanotubes," Advance Functional Materials, 2008, pp. 3403-3409.

Li et al., "Study on Variation of Structure and Properties of Natural Rubber During Accelerated Storage," Journal of Applied Polymer Science, vol. 70, 1779-1783, 1998.

\* cited by examiner

CARBON FIBER COMPOSITE MATERIAL AND PROCESS FOR PRODUCING THE SAME

This is a continuation of application Ser. No. 10/821,175, filed Apr. 9, 2004, now U.S. Pat. No. 7,785,701, which claims the benefit of Japanese Patent Application Nos. 2003-105294 filed Apr. 9, 2003, 2003-150164, filed May 28, 2003, 2003-309932, filed Sept. 2, 2003 and 2004-113469, filed Apr. 7, 2004. The disclosure of the prior applications is hereby incorporated by reference herein in their entirety.

FIELD OF THE INVENTION

The present invention relates to a carbon fiber composite material and a process for producing the same.

BACKGROUND

Recently, composite materials using a carbon nanofiber have been attracted much attention. Such composite materials are expected to have improved mechanical strength owing to the incorporation of a carbon nanofiber. However, since the fibrils of the carbon nanofiber mutually have a strong aggregating property, it is considered to be very difficult to homogeneously disperse the carbon nanofiber into substrates of composite materials. Therefore, it is currently difficult to obtain a composite material of a carbon nanofiber having desired properties and also it is impossible to efficiently utilize an expensive carbon nanofiber.

SUMMARY

Thus, an object of the invention is to provide a carbon fiber composite material in which a carbon nanofiber is homogeneously dispersed.

Another object is to provide a process for producing the same.

Other objects and effects of the invention will become apparent from the following description.

The above-mentioned objects of the present invention have been achieved by providing a carbon fiber composite material comprising an elastomer and a carbon nanofiber dispersed in the elastomer, wherein the elastomer has an unsaturated bond or a group, having affinity to the carbon nanofiber.

In the carbon fiber composite material of the invention, bonding of the unsaturated bond or group of the elastomer with an active part of the carbon nanofiber, especially a terminal radical of the carbon nanofiber, weakens aggregating force of the carbon nanofiber and enables enhancement of its dispersibility. As a result, the carbon fiber composite material of the invention can have a structure that the carbon nanofiber is homogeneously dispersed into the elastomer which serves as a substrate.

The elastomer used in the invention may be either of a rubber elastomer or a thermoplastic elastomer. Moreover, in the case of the rubber elastomer, the elastomer may be either of a crosslinked form or an uncrosslinked form. As a starting elastomer, an uncrosslinked form is used in the case of the rubber elastomer.

The carbon fiber composite material according to the invention may comprise an elastomer and a carbon nanofiber dispersed in the elastomer, wherein the elastomer in the composite material is in its uncrosslinked form and has a first spin-spin relaxation time (T$2n$) of 100 to 3,000 μsec and a second spin-spin relaxation time (T$2nn$) of being absent or 1,000 to 10,000 μsec, a fraction (fnn) of components having the second spin-spin relaxation time of less than 0.2, as measured at 150° C. by the Hahn-echo method using pulsed NMR technique.

Moreover, the carbon fiber composite material according to the invention may comprise an elastomer and a carbon nanofiber dispersed in the elastomer, wherein the elastomer in the composite material is in its crosslinked form and has a first spin-spin relaxation time (T$2n$) of 100 to 2,000 μsec, a second spin-spin relaxation time (T$2nn$) of being absent or 1,000 to 5,000 μsec, and a fraction (fnn) of components having the second spin-spin relaxation time of less than 0.2, as measured at 150° C. by the Hahn-echo method using pulsed NMR technique.

The carbon fiber composite material of the invention has such properties and a structure in which a carbon nanofiber is homogeneously dispersed into an elastomer as a substrate.

The process for producing a carbon fiber composite material according to the invention comprises a step of dispersing a carbon nanofiber into an elastomer by shear force, wherein the elastomer has an unsaturated bond or a group, having affinity to the carbon nanofiber.

According to the process of the invention, a carbon fiber composite material having a good dispersibility of the carbon nanofiber and also excellent dispersion stability thereof can be obtained.

The step of dispersing a carbon nanofiber into an elastomer by shear force can be carried out, for example, by any of the methods:

(a) an open-roll method with a roll distance of 0.5 mm or less,
(b) a closed kneading method with a rotor distance of 1 mm or less,
(c) a multi-screw extruding kneading method with a screw distance of 0.3 mm or less.

The reference numerals used in the drawings denote the followings, respectively.

10: First roll
20: Second roll
30: Elastomer
40: Carbon nanofiber

DETAILED DESCRIPTION OF EMBODIMENTS

The present invention is described in more detail below with reference to the drawings.

The process according to the present invention comprises a step of dispersing a carbon nanofiber into an elastomer by shear force. The elastomer has an unsaturated bond or a group, having affinity to the carbon nanofiber.

The elastomer desirably has characteristics such as a certain degree of molecular length and flexibility in addition to the high affinity to the carbon nanofiber. Moreover, the step of dispersing the carbon nanofiber into the elastomer by shear force is desirably conducted by kneading them with a shear force as high as possible.

(a) Elastomer

The elastomer has a weight average molecular weight of preferably 5,000 to 5,000,000, more preferably 20,000 to 3,000,000. When the molecular weight of the elastomer is within the range, the elastomer molecules are intertwined and mutually linked and hence the elastomer easily penetrates into aggregated fibrils of the carbon nanofiber, so that a large effect of separating the fibrils of the carbon nanofiber from one another may be attained. When the molecular weight of the elastomer is smaller than 5,000, it may be hard for the elastomer molecules to sufficiently get intertwined and hence the effect of separating the fibrils of the carbon nanofiber is reduced even when shear force is applied in the subsequent step. Moreover, when the molecular weight of the elastomer is larger than 5,000,000, the elastomer may come to have a too high hardness, making it difficult to be processed.

The elastomer has a spin-spin relaxation time ($T2n/30°$ C.) of its network component of preferably 100 to 3,000 μsec, more preferably 200 to 1,000 μsec in its uncrosslinked form, which is measured at 30° C. by the Hahn-echo method using pulsed NMR technique. The spin-spin relaxation time ($T2n/30°$ C.) of the above range can realize an elastomer which is flexible and has a sufficiently high molecular mobility. Thereby, when the elastomer is mixed with the carbon nanofiber, the elastomer can easily penetrate into a space between the fibrils of the carbon nanofiber owing to its high molecular mobility. When the spin-spin relaxation time ($T2n/30°$ C.) is shorter than 100 μsec, the elastomer may not be able to have a sufficient molecular mobility. Moreover, the spin-spin relaxation time ($T2n/30°$ C.) is longer than 3,000 μsec, the elastomer is apt to flow as a liquid and it becomes difficult to disperse the carbon nanofiber.

In addition, the elastomer preferably has a spin-spin relaxation time ($T2n$) of its network component of 100 to 2,000 sec in its crosslinked form, as measured at 30° C. by the Hahn-echo method using pulsed NMR technique. The reasons are the same as those in the case of the above uncrosslinked form. That is, when the uncrosslinked form fulfilling the above requirements is crosslinked according to the process of the invention, $T2n$ of the resulting crosslinked form almost falls within the above range.

The spin-spin relaxation time obtained by the Hahn-echo method using pulsed NMR technique is a measure representing the molecular mobility of a substance. Specifically, when the spin-spin relaxation time of an elastomer is measured by the Hahn-echo method using pulsed NMR technique, a first component having a first spin-spin relaxation time ($T2n$) which is a shorter relaxation time and a second component having a second spin-spin relaxation time ($T2nn$) which is a longer relaxation time are detected. The first component corresponds to the network component (backbone molecule) of the polymer and the second component corresponds to the non-network component (digressive component such as a terminal chain). The shorter the first spin-spin relaxation time is, the lower the molecular mobility is and the harder the elastomer is. Moreover, the longer the first spin-spin relaxation time is, the higher the molecular mobility is and the softer the elastomer is.

As a measuring method in the pulsed NMR technique, not only the Hahn-echo method but also the solid-echo method, the CPMG method (Carr-Purcel-Meiboom-Gill method) or the 90° pulse method can be applied. However, since the carbon fiber composite material according to the invention has a medium degree of the spin-spin relaxation time ($T2$), the Hahn-echo method is most suitable. Generally, the solid-echo method and the 90° pulse method are suitable for the measurement of a short $T2$, the Hahn-echo method is suitable for a medium degree of $T2$, and the CPMG method is suitable for a long $T2$.

The elastomer has, in at least one of its main chain, side chains and terminal chains, an unsaturated bond or a group, having affinity to the carbon nanofiber, especially its terminal radical, or has a property of easily forming such a radical or group. Such an unsaturated bond or group may be at least one selected from a double bond, a triple bond and functional groups such as α-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group and a urea group.

A carbon nanofiber is usually constituted by of six-membered rings of carbon atoms at the side surface and has a closed structure by a five-membered ring introduced at the end thereof. However, since it has a forced structure, a defect may be apt to occur and a radical or a functional group tends to form at that part. In the present invention, since a unsaturated bond or a group, having a high affinity (reactivity or polarity) to the radical of the carbon nanofiber is present in at least one of its main chain, side chains and terminal chains of the elastomer, the elastomer and the carbon nanofiber can be connected with each other. Thereby, the carbon nanofiber can be easily dispersed with overcoming the cohesive force of the carbon nanofiber.

As the elastomer, use can be made of elastomers such as natural rubber (NR), epoxidized natural rubber (ENR), styrene-butadiene rubber (SBR), nitrile rubber (NBR), chloroprene rubber (CR), ethylene propylene rubber (E PR, EPDM), butyl rubber (IIR), chlorobutyl rubber (C ZIR), acryl rubber (ACM), silicone rubber (Q), fluorine-containing rubber (FKM), butadiene rubber (BR), epoxidized butadiene rubber (EBR), epichlorohydrin rubber (CO, CEO), urethane rubber (U), and polysulfide rubber (T); thermoplastic elastomers such as olefin-based elastomers (TPO), poly(vinyl chloride)-based elastomers (T PVC), polyester-based elastomers (TPEE), polyurethane-based elastomers (TPU), polyamide-based elastomers (TPEA), and polystyrene-based elastomers (SBS); and mixtures thereof. Under the researches of the present inventors, it is known that a carbon nanofiber can be more homogeneously dispersed in either nitrile rubber (NBR) having a high polarity or natural rubber (NR) including various polar groups such as protein compared with ethylene propylene rubber (EPDM) which is particularly nonpolar. As a result, the dispersibility of the carbon nanofiber may be enhanced by using natural rubber (NR) or nitrile rubber (NBR) as an elastomer.

(b) Carbon Nanofiber

The carbon nanofiber preferably has an average diameter of 0.5 to 500 nm, more preferably 0.5 to 100 nm. In addition, the carbon nanofiber preferably has an average length of 0.01 to 1,000 μm.

The mixing amount of the carbon nanofiber is not particularly limited and can be set depending on the intended application. In the carbon fiber composite material of the present invention, a crosslinked elastomer, an uncrosslinked elastomer or a thermoplastic polymer can be used, without any preliminary treatment, as the elastomer material. The carbon fiber composite material of the invention can be used as a starting material of a composite material with a metal or a resin. When the carbon fiber composite material of the invention is used as a starting material of the composite material with a metal or a resin, the carbon nanofiber can be incorporated in a ratio of 0.01 to 50% by weight. The above-mentioned starting material of a composite material with a metal or a resin can be used as a so-called masterbatch, i.e., a source of a carbon nanofiber at the time when a carbon nanofiber is mixed with the metal or the resin.

As examples of the carbon nanofiber, a so-called carbon nanotube and the like can be cited. The carbon nanotube has, a mono-layer structure in which a graphene sheet of a carbon hexagonal network is closed into a cylindrical form or a multi-layer structure in which these cylindrical structures are arranged in a nested form. That is, the carbon nanotube may comprise the mono-layer structure substance alone or of the multi-layer structure substance alone, or may comprise a mixture of the mono-layer structure substance and the multi-layer structure substance. Moreover, a carbonaceous material partially having a structure of carbon nanotube can be also used. In this regard, the carbon, nanotube is sometimes referred to as the name of graphite fibril nanotube instead of the name of carbon nanotube.

The mono-layer carbon nanotube or the multi-layer carbon nanotube can be produced in a desired size by the arc discharge method, the laser abrasion method, the vapor-phase growth method, or the like, The arc discharge method is a method wherein arc-discharge is conducted between electrode materials made of carbon rods under an argon or hydrogen atmosphere having a pressure slightly lower than atmospheric pressure to obtain a multi-layer carbon nanotube deposited on the negative electrode. Moreover, the mono layer carbon nanotube is obtained from soot attached onto the inside surface of a treating vessel by conducting arc-discharge with mixing a catalyst of nickel/cobalt or the like in the above carbon rods.

The laser abrasion method is a method wherein a target carbon surface mixed with a catalyst of nickel/cobalt or the like is irradiated with a strong pulse laser light of YAG laser in noble gas (e.g., argon) to melt and evaporate the carbon surface and thereby a mono-layer carbon nanotube is obtained.

The vapor-phase growth method comprises thermally decomposing a hydrocarbon such as benzene or toluene in a vapor phase to synthesize a carbon nanotube. More specifically, the flow catalyst method, the zeolite supported catalyst method, and the like can be mentioned as examples.

The carbon nanofiber can be subjected to surface treatment, for example, ion-injection treatment, spatter-etching treatment, plasma treatment or the like, beforehand prior to the kneading with the elastomer to achieve improvement of adhesiveness and wetting property with the elastomer.

(c) Dispersing Step

Figure 1:
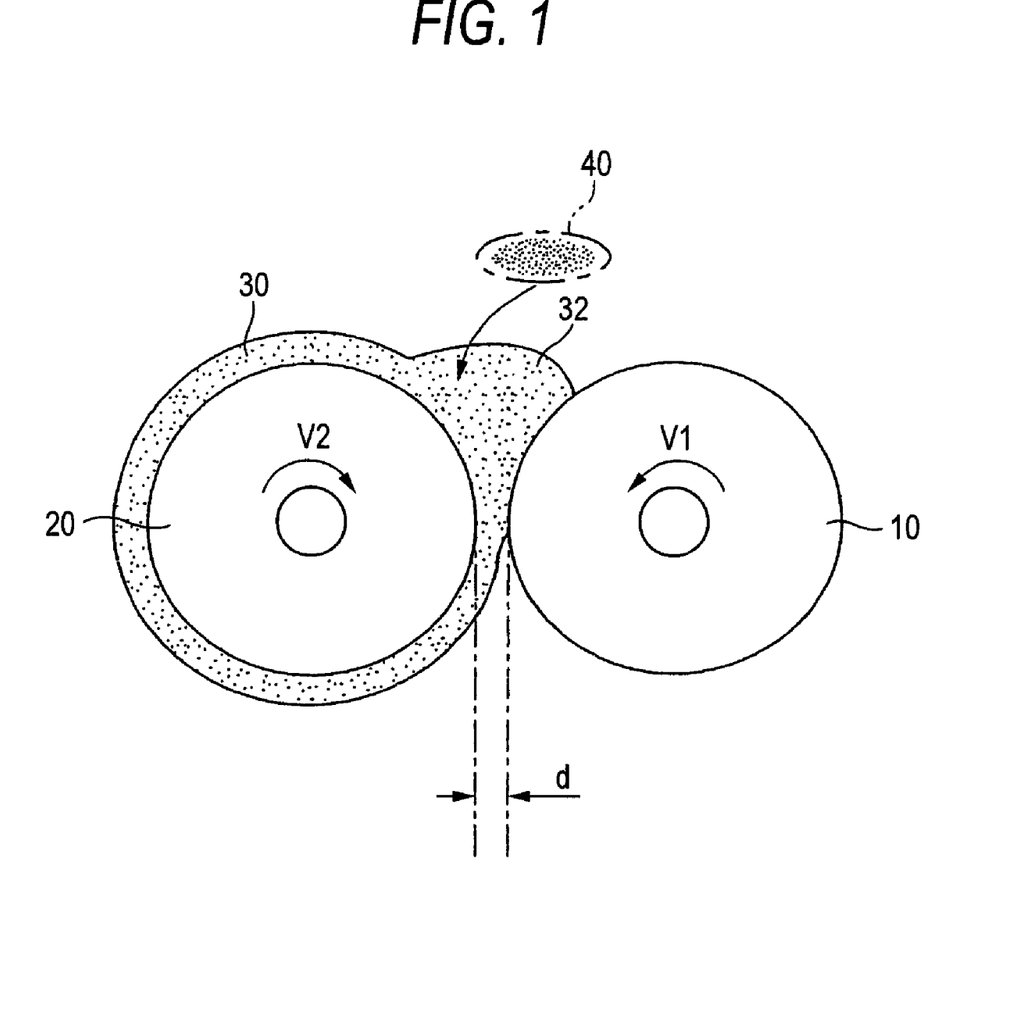
FIG. 1 is a drawing typically illustrating the kneading process of an elastomer with carbon nanofiber by the open-roll method referred to in the detailed description of the present invention.

An example of the step of dispersing a carbon nanofiber into an elastomer by shear force is described below with reference to the case of using the open-roll method with a roll distance of 0.5 mm or less.

FIG. 1 is a drawing typically illustrating the open-roll method using two rolls. In FIG. 1, the reference numeral 10 represents a first roll and the reference numeral 20 represents a second roll. The first roll 10 and the second roll 20 are arranged with a predetermined distance d, which is preferably 0.5 mm or less, more preferably 0.1 to 0.3 mm. The first and second rolls rotate normally or reversely. In the example shown in the figure, the first roll 10 and the second roll 20 are rotating in the directions indicated by the arrows. When the surface velocity of the first roll 10 is represented by V1 and the surface velocity of the second roll by V2, then surface velocity ratio of these rolls (V1/V2) is preferably 1.05 to 3.00. By using such a surface velocity ratio, a desired shear force can be obtained. The shear force in this step can be suitably set depending on the kind of the elastomer, the amount of the carbon nanofiber, and the like.

Moreover, in order to obtain a shear force as high as possible, the elastomer and the carbon nanofiber are mixed at a temperature of preferably 0 to 50° C., more preferably 5 to 30° C. When the open-roll method is employed, it is desirable to set the roll temperature to the above temperature.

When an elastomer 30 is put around the second roll 20 in a state that the first and second rolls are rotating, a so-called bank 32 is formed where the elastomer is accumulated between the rolls 10 and 20. Mixing of the elastomer 30 with a carbon nanofiber 40 is carried out by adding the carbon nanofiber 40 into the bank 32 and rotating the first and second rolls. Then, the distance between the first and second rolls 10 and 20 is further narrowed to the aforementioned d and the first and second rolls 10 and 20 are rotated at a predetermined surface velocity ratio in this state. Thereby, a high shear force is applied to the elastomer 30 and the aggregated fibrils of the carbon nanofiber are separated from one another by the shear force and dispersed in the elastomer 30.

At this time, since the elastomer used in the present invention facilitates the dispersion of the carbon nanofiber thanks to the aforementioned characteristics of the elastomer, such as the molecular figuration (length), molecular motion and chemical interaction with the carbon nanofiber, a carbon fiber composite material excellent in dispersibility and dispersion stability difficulty of re-aggregation of the carbon nanofiber) can be obtained. More specifically, when the elastomer is mixed with the carbon nanofiber, the elastomer having an appropriate molecular length and a high molecular mobility penetrates between the fibrils of the carbon nanofiber and a specific part of the elastomer connects with a highly active part of the carbon nanofiber through the chemical interaction. When a high shear force is applied to a mixture of the elastomer and the carbon nanofiber in this state, the carbon nanofiber moves as the elastomer moves and thereby the aggregated fibrils of the carbon nanofiber are separated and dispersed in the elastomer. The carbon nanofiber once dispersed is prevented from re-aggregation by the action of the chemical interaction with the elastomer, thereby good dispersion stability can be realized.

The step of dispersing a carbon nanofiber into an elastomer by shear force can be also conducted by the use of the closed kneading method or multi-screw extruding method as already mentioned, and hence the dispersing step is not limited to the above open-roll method. In other words, it is only required in this step to apply shear force sufficient to separate the aggregated fibrils of the carbon nanofiber to the elastomer.

After the above step of dispersing the carbon nanofiber into the elastomer and mixing them (mixing and dispersing step), an extruding step, a molding step, a crosslinking step and the like steps can be conducted in accordance with known methods.

In the mixing and dispersing step of the elastomer with the carbon nanofiber or subsequent to the mixing and dispersing step, additives generally used for processing of elastomers such as rubber may be added. As the additives, known ones may be used. Examples of the additives include a crosslinking agent, a vulcanizing agent, a vulcanization accelerator, a vulcanization retardant, a softener, a plasticizer, a curing agent, a reinforcing agent, a filler, an antiaging agent, and a colorant.

(d) The Resulting Carbon Fiber Composite Material

The carbon fiber composite material of the invention is a material in which a carbon nanofiber is homogeneously dispersed into an elastomer serving as a substrate. In other words, this is a state that the elastomer is restrained by the carbon nanofiber. In this state, the mobility of the elastomer molecule restrained by the carbon nanofiber is reduced as compared with the case where it is not restrained by the carbon nanofiber. Therefore, the first spin-spin relaxation time ($T2n$), the second spin-spin relaxation time ($T2nn$) and a spin-lattice relaxation time (Ti) of the carbon fiber composite material according to the invention become shorter than those in the case of the elastomer alone containing no carbon nanofiber. In this regard, the spin-lattice relaxation time (Ti) in a crosslinked form varies in proportion to the mixing amount of the carbon nanofiber.

Moreover, under the state that the elastomer molecule is restrained by the carbon nanofiber, non-network components (non-reticulate chain components) are considered to decrease for the following reasons. That is, when the molecular mobility of the elastomer is lowered as a whole by the carbon nanofiber, the non-network components are considered to decrease for the reasons that non-mobile parts of the non-network components increase and hence the components tends to behave like network components and that the non-network components (terminal chains) are easy to move and hence apt to be adsorbed to the active point of the carbon nanofiber. Therefore, the fraction (fnn) of the components having the second spin-spin relaxation time becomes smaller than the fraction in the case of the elastomer alone containing no carbon nanofiber.

Based on the above, the carbon fiber composite material according to the present invention desirably has measured values within the following ranges, as obtained by the Hahn-echo method using pulsed NMR technique.

That is, referring to the elastomer in the composite material in its uncrosslinked form, it is preferred that the first spin-spin relaxation time ($T2n$) is 100 to 3,000 μsec and the second spin-spin relaxation time ($T2nn$) is 1,000 to 10,000 μsec, as measured at 150° C., and further that the fraction (fnn) of components having the second spin-spin relaxation time is less than 0.2.

Moreover, referring to the elastomer in the composite material in its crosslinked form, it is preferred that the first spin-spin relaxation time ($T2n$) is 100 to 2,000 μsec and the second spin-spin relaxation time ($T2nn$) is 1,000 to 5,000 μsec, as measured at 150° C., and further that the fraction (fnn) of components having the above second spin-spin relaxation time is less than 0.2.

The spin-lattice relaxation time (Ti) measured by the Hahn-echo method using pulsed NMR technique is a measure showing the molecular mobility of a substance as well as the spin-spin relaxation time (T2). Specifically, the shorter the spin-lattice relaxation time of the elastomer is, the lower the molecular mobility is and the harder the elastomer is. Also, the longer the spin-lattice relaxation time of the elastomer is, the higher the molecular mobility is and the softer the elastomer is.

The carbon fiber composite material according to the invention preferably has a flow temperature higher than the inherent flow temperature of the starting elastomer alone by 20° C. or more, as determined by the temperature-dependent measurement of dynamic viscoelasticity. In the carbon fiber composite material of the invention, the carbon nanofiber is satisfactorily dispersed in the elastomer. In other words, as mentioned above, this is a state that the elastomer is restrained by the carbon nanofiber. In this state, the elastomer exhibits a decreased molecular motion as compared with the case that it does not contain the carbon nanofiber. As a result, the flowability is lowered. Owing to such a flow temperature characteristic, the carbon fiber composite material of the invention exhibits a small temperature dependency of dynamic viscoelasticity and, as a result, has an excellent thermal resistance.

As already mentioned, the carbon fiber composite material of the invention can be used as an elastomer material or as a starting material for composite materials with metals or resins. A carbon nanofiber usually has a nature of difficultly dispersing into a medium owing to the mutual intertwining. However, when the carbon fiber composite material of the invention is used as a starting material for composite materials with metals or resins, a carbon nanofiber can be easily dispersed into a medium such as a metal or a resin by mixing the material with the medium since the carbon nanofiber is present in the state that it has already been dispersed in the elastomer.

EXAMPLES

The present invention will be illustrated in greater detail with reference to the following Examples and Comparative Examples, but the invention should not be construed as being limited thereto.

Examples 1-6 and Comparative Examples 1-3

1. Preparation of Samples

A polymer substance shown in Table 1 was kneaded with a predetermined amount of a carbon nanofiber by the open-roll method to obtain a sample. The sample was treated in the following manners to prepare an uncrosslinked sample and a crosslinked sample.

(a) Preparation of Uncrosslinked Samples:

1) Into a 6 inch open roll (roll temperature: 10-20° C.) was charged a predetermined amount (100 g) of a polymer substance (100 parts by weight (phr)) shown in Table 1, thereby the substance was put around the roll.

2) Into the polymer substance was charged a carbon nanofiber (referred to as "CNT" in Table 1) in an amount (parts by weight) shown in Table 1. At this time, distance between the rolls was set to 1.5 mm.

3) After the charge of the carbon nanofiber, the resulting mixture of the polymer substance and the carbon nanofiber was taken out of the rolls.

4) The distance between the rolls was narrowed from 1.5 mm to 0.3 mm and the mixture was charged and then subjected to tight milling. At this time, the surface velocity ratio of two rolls was set to 1.1. The tight milling was repeated ten times.

5) The rolls were set to have a predetermined distance (1.1 mm) and the mixture having been subjected to the tight milling was charged and subjected to sheeting.

According to the above procedure, uncrosslinked samples of Examples 1 to 6 and Comparative Examples 2 and 3 were obtained.

As a plasticizer for Comparative Example 1 was used liquid 2-diethylhexyl phthalate (molecular weight: 391). Ethyl cellulose which is a thermoplastic resin was used for Comparative Example 2. Furthermore, as Comparative Example 3, an uncrosslinked sample of a polymer substance (EPDM) containing no carbon nanofiber was obtained in a similar manner with the exception that no carbon nanofiber was mixed in the above steps 1) to 5).

b) Preparation of Crosslinked Samples:

The steps 1) to 4) were conducted in the same manner as in the case of the uncrosslinked samples.

5) The rolls were set to have a predetermined distance (1.1 mm) and the mixture having been subjected to the tight milling was charged and a predetermined amount of a crosslinking agent (2 parts by weight) was further charged into the mixture. Thereafter, the mixture was subjected to sheeting.

6) A sample cut into a mold size was set onto a mold and subjected to press-crosslinking at 175° C. and 100 kgf/cm2 for 20 minutes.

According to the above procedure, crosslinked samples of Examples 1 to 5 and Comparative Example 3 were obtained. In Example 6, SBS (styrene-butadiene-styrene thermoplastic elastomer) was used as a starting elastomer and no crosslinking was conducted. In Comparative Example 1, a liquid polymer substance was used and no crosslinking was conducted. Moreover, in Comparative Example 2, a thermoplastic resin was used and also no crosslinking was conducted.

2. Measurement Using Pulsed NMR Technique

Each of the uncrosslinked samples and the crosslinked samples was measured by the Hahn-echo method using pulsed NMR technique. The measurement was conducted using "JMN-MU25" manufactured by JEOL Ltd. It was conducted using 1H as an observing nucleus under the conditions of a resonance frequency of 25 MHz and a 90° pulse width of 2 μsec and a damping curve was determined with changing Pi in the pulse sequence (90° x-Pi-180° x) of the Hahn-echo method. The sample was measured with inserting a sample tube into an adequate range of the magnetic field. The measuring temperature was 150° C. By the measurement, there were determined the first and second spin-spin relaxation times (T2$n$, T2$nn$) and the fraction (f$nn$) of components having the second spin-spin relaxation time in each of the respective starting elastomers alone the uncrosslinked and crosslinked samples of the composite materials. The results of the measurement were shown in Table 1. In addition, the first spin-spin relaxation times (T2$n$) of the respective starting elastomers at 30° C. were determined and the results were also described in Table 1. On each of the crosslinked samples of the composite materials, a changed amount of a spin-lattice relaxation time (ΔT1) per % by volume of carbon nanofiber was determined. The results of the measurement were shown in Table 1.

3. Measurements of E' (Dynamic Storage Modulus), TB (Tensile Strength) and EB (Elongation at Break)

On each of the crosslinked samples of the composite materials, E', TB, and EB were measured in accordance with JIS K 6521-1993. These results were shown in Table 1. The sample of Comparative Example 1 is liquid and hence it was impossible to measure these properties. In Comparative Example 2, the measurements were made with respect to the uncrosslinked sample, and the symbol was attached to the numerical results thereof.

4. Measurement of Flow Temperature

On each of the uncrosslinked samples of the starting elastomer alone and the composite materials, a flow temperature was determined by dynamic viscoelasticity measurement (JIS K 6394). Specifically, the flow temperature was determined by applying sine vibration (±0.1% or less) to a sample having a width of 5 mm, a length of 40 mm, and a thickness of 1 mm and measuring the stress and phase difference S generated therefrom. At this time, the temperature was varied from −70° C. until 150° C. at an elevation rate of 2° C./min. The results were shown in Table 1. In Table 1, a case that no flow phenomenon was observed until 150° C. was indicated as "150° C. or higher".

|  |  | Ex. 1 | Ex. 2 | Ex. 3 | Ex. 4 | Ex. 5 |
|---|---|---|---|---|---|---|
| Starting Elastomer | Polymer substance | EPDM | EPDM | NR | NBR | SBR |
|  | Polar group | Double bond Norbornene | Double bond Norbornene | Double bond | Double bond Nitrile group | Double bond |
|  | Average molecular weight | 200,000 | 200,000 | 3,000,000 | 200,000 | 150,000 |
|  | Uncrosslinked form T2$n$(30° C.)(μsec) | 520 | 520 | 700 | 300 | 400 |
|  | T2$n$ (150° C.) haw) | 2200 | 2200 | 5500 | 2000 | 2400 |
|  | T2$nn$ (150° C.) (μsec) | 16000 | 16000 | 18000 | 14000 | 17000 |
|  | f$nn$(150° C.) | 0.405 | 0.405 | 0.381 | 0.133 | 0.286 |
|  | Flow temperature (° C.) | 55 | 55 | 40 | 75 | 35 |
| Formulation | Polymer material (phr) | 100 | 100 | 100 | 100 | 100 |
|  | CNT (phr) | 10 | 60 | 10 | 10 | 10 |
| Composite material | Uncrosslinked form T2$n$ (150° C.) (μsec) | 1800 | 1400 | 2000 | 1700 | 2200 |
|  | T2$nn$ (150° C.) (μsec) | 6000 | none | 9000 | 9600 | 5600 |
|  | f$nn$ (150° C.) | 0.183 | 0 | 0.089 | 0.045 | 0.171 |
|  | Flow temperature (° C.) | 75 | 150° C. or higher | 100 | 150° C. or higher | 100 |
|  | Crosslinked form T2$n$ (150° C.) (μsec) | 575 | 620 | 1240 | 597 | 484 |
|  | T2$nn$ (150° C.) (lmo) | 3870 | none | 3830 | 3380 | 2590 |
|  | f$nn$ (150° C.) | 0.07 | 0 | 0.113 | 0.088 | 0.071 |
|  | E'(30° C.)(MPa) | 5.86 | 52.1 | 2.61 | 6.9 | 6.6 |
|  | TB (MPa) | 6.7 | 25.0 | 16.6 | 6.5 | 4.6 |
|  | EB (%) | 170 | 82 | 170 | 110 | 50 |
|  | •T1(msec/CNF 1 vol %) | 4.2 | 6.5 | 8.3 | 11.5 | 7.6 |

-continued

|  |  |  | Ex. 6 | Comp. Ex. 1 | Comp. Ex. 2 | Comp. Ex. 3 |
|---|---|---|---|---|---|---|
| Starting Elastomer |  | Polymer substance | SBS | Polymer plasticizer | Ethyl cellulose | EPDM |
|  |  | Polar group | Double bond | Ester group | Ethoxy group | Double bond Norbornene |
|  | Average molecular weight |  | 100,000 | 391 | 100,000 | 200,000 |
|  | Uncrosslinked form | $T2n(30°\ C.)$ (μsec) | 200 | 550000 | 50 | 520 |
|  |  | $T2n(150°\ C.)$ haw) | 2100 | Impossible to measure | 12000 | 2200 |
|  |  | $T2nn(150°\ C.)$ (μsec) | 10000 |  | (1 component) | 16000 |
|  |  | $fnn(150°\ C.)$ | 0.653 |  | Impossible to measure | 0.405 |
|  |  | Flow temperature (° C.) | 100 | liquid | 65 | 55 |
| Formulation |  | Polymer material (phr) | 100 | 100 | 100 | 100 |
|  |  | CNT (phr) | 10 | 10 | 10 | 0 |
| Composite material | Uncrosslinked form | $T2n(150°\ C.)$ (μsec) | 1500 | Impossible to measure | 13000 | 2200 |
|  |  | $T2nn(150°\ C.)$ (μsec) | 4000 |  | (1 component) | 18000 |
|  |  | $fnn(150°\ C.)$ | 0.135 |  |  | 0.385 |
|  |  | Flow temperature (° C.) | 150° C. or higher | liquid | 70 | 55 |
|  | Crosslinked form | $T2n(150°\ C.)$ (μsec) | — | Impossible to measure | Un-crosslinked form | 640 |
|  |  | $T2nn(150°\ C.)$ (lmo) |  |  |  | 4150 |
|  |  | $fnn(150°\ C.)$ | — |  |  | 0.117 |
|  |  | $E'(30°\ C.)$ (MPa) |  |  | 62' | 2.98 |
|  |  | TB (MPa) | — | Impossible to measure | $14.5^k$ | 1.7 |
|  |  | EB (%) |  |  | 25' | 180 |
|  |  | •T1(msec/CNF 1 vol %) | — | 4 | 0 | 0 |

From Table 1, according to Examples 1 to 6 of the invention, the following has been confirmed. That is, the spin-spin relaxation times of the composite materials (uncrosslinked and crosslinked samples) containing the carbon nanofiber at 150° C. ($T2n$ and $T2nn/150°$ C.) are shorter than those of the starting elastomer alone containing no carbon nanofiber. Moreover, the component fraction (fnn/150° C.) of the composite materials (uncrosslinked and crosslinked samples) containing the carbon nanofiber is smaller than that of the starting elastomer alone containing no carbon nanofiber. Furthermore, the spin-lattice relaxation time (Ti) of the crosslinked samples containing the carbon nanofiber is shorter than that of the starting elastomer alone containing no carbon nanofiber by the changed amount ($\Delta T1$). Based on these findings, it is understood that the carbon nanofiber is well dispersed in the carbon fiber composite materials according to the Examples.

This fact is more clearly understood when Examples 1 and 2 are compared with Comparative Example 3. That is, in Comparative Example 3 wherein no carbon nanofiber is incorporated, the spin-spin relaxation times ($T2n$ and $T2nn/150°$ C.) of the uncrosslinked sample are not so different from those of the starting elastomer alone. On the other hand, in Examples 1 and 2 of the invention, the spin-spin relaxation times ($T2n$ and $T2nn/150°$ C.) of the uncrosslinked samples are considerably shorter than those of the starting elastomer alone. In Example 2 wherein the content of the carbon nanofiber is large, the spin-spin relaxation time ($T2nn/150°$ C.) of the uncrosslinked sample was not detected. Based on these findings, it has been confirmed that, referring to the uncrosslinked samples, Examples 1 and 2 are remarkably different in $T2n$ and $T2nn$ from Comparative Example 3. In addition, a similar fact has been confirmed also on the component fraction (fnn/150° C.).

Referring to the crosslinked examples, it has been confirmed that the spin-spin relaxation times ($T2n$ and $T2nn/150°$ C.) are all shorter than those of the starting elastomer alone. Particularly, in Example 2 wherein the content of the carbon nanofiber is large, the spin-spin relaxation time ($T2nn/150°$ C.) of the crosslinked sample was not detected. Based on these findings, it has been confirmed that, also in the crosslinked samples, Examples 1 and 2 are remarkably different in $T2n$ and $T2nn$ from Comparative Example 3. In addition, a similar fact has been confirmed also on the component fraction •(fnn/150° C.). Furthermore, the changed amounts of the spin-lattice relaxation time ($\Delta T1$) per % by volume of the carbon nanofiber in the Examples are all found to be large values and hence it has been confirmed that the molecular mobility is lowered as compared with the case of the starting elastomer alone.

Moreover, based on the results of E', TB, and EB using the crosslinked samples, it has been confirmed that the incorporation of the carbon nanofiber improves dynamic storage modulus and tensile strength with maintaining elongation at break and thus a remarkable reinforcing effect can be obtained by the action of the carbon nanofiber. This fact is more clearly understood when Examples 1 and 2 are compared with Comparative Example 3 wherein no carbon nanofiber is incorporated. Particularly, in Example 2 wherein the content of the carbon nanofiber is large, it is understood that dynamic storage modulus and tensile strength are remarkably improved.

Furthermore, since the flow temperature in the composite material (uncrosslinked sample) containing the carbon nanofiber is higher than that of the elastomer alone containing no carbon nanofiber by 20° C. or more, it is understood that the composite material has a small temperature dependency of dynamic viscoelasticity and thus an excellent thermal resistance.

In Comparative Example 1, the carbon nanofiber could not be dispersed owing to too small molecular weight of the polymer. The spin-spin relaxation times and properties E', TB, and FB could not be measured.

In Comparative Example 2, it has been confirmed that the carbon nanofiber could not be thoroughly dispersed owing to too small first spin-spin relaxation time ($T2n$) of the starting polymer at 30° C. Moreover, it has been confirmed that molecular mobility is too high to apply shear force to the sample and thus the carbon nanofiber is difficult to be dispersed owing to too large spin-spin relaxation time ($T2nn$) at 150° C.

In addition, in Comparative Example 3, no reinforcing effect was observed owing to no incorporation of carbon nanofiber.

Figure 2:
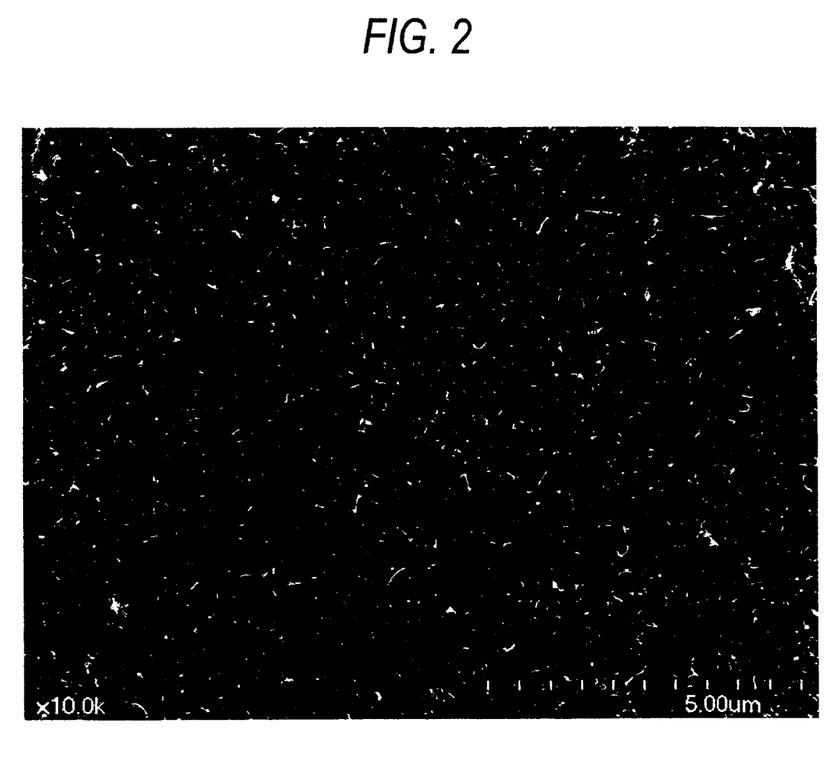
FIG. 2 is a drawing illustrating the SEM image of the composite material obtained in Example 4.

Furthermore, an image of the crosslinked sample of the composite material obtained in Example 4 was obtained on SEM (Scanning Electron Microscopy). The SEM image is shown in FIG. 2. The scanning conditions in this case were as follows: acceleration voltage of 3.0 kV and magnification of 10.0 k. From FIG. 2, it has been confirmed that the carbon nanofiber is homogeneously dispersed in the elastomer substrate in a state that the fibrils of the carbon nanofiber are separated from one another. In FIG. 2, whitish line parts show the carbon nanofiber.

Figure 3:
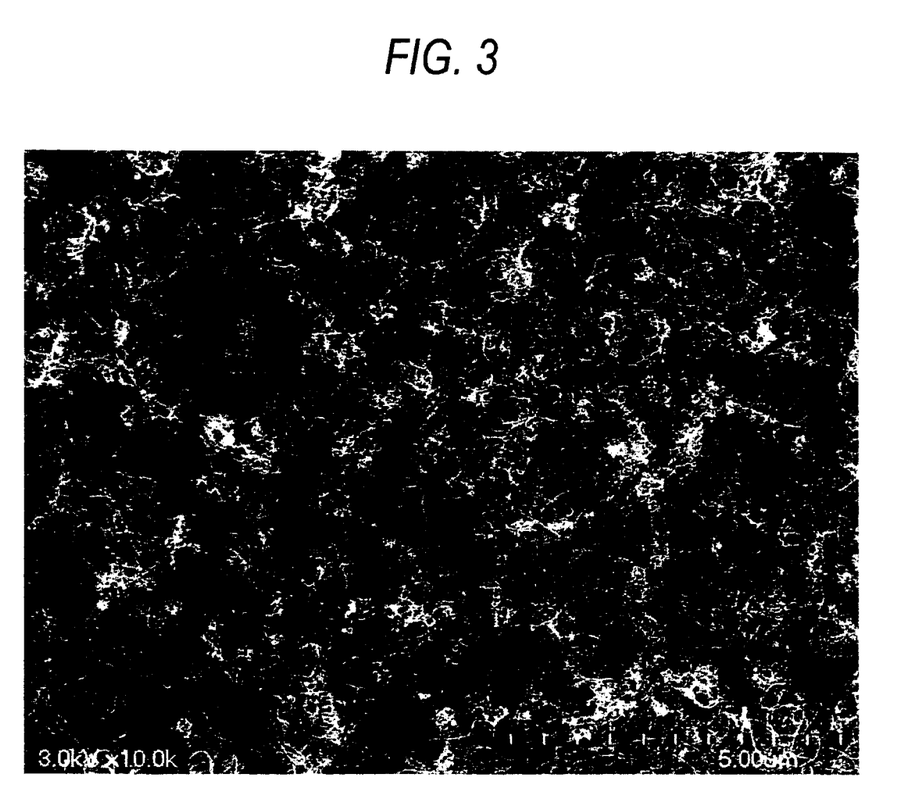
FIG. 3 is a drawing illustrating the SEM image of the starting carbon nanofiber.

For the purpose of reference, an SEM image of the starting carbon nanofiber before mixing is shown in FIG. 3. The scanning conditions for SEM were as follows: acceleration voltage of 3.0 kV and magnification of 10.0 k. From the SEM image of FIG. 3, it is understood that the fibrils of the starting carbon nanofiber are intertwined with one another.

As mentioned above, according to the invention, it is evident that a carbon nanofiber generally very difficult to be dispersed into a substrate can be homogeneously dispersed in an elastomer.

Figure 4:
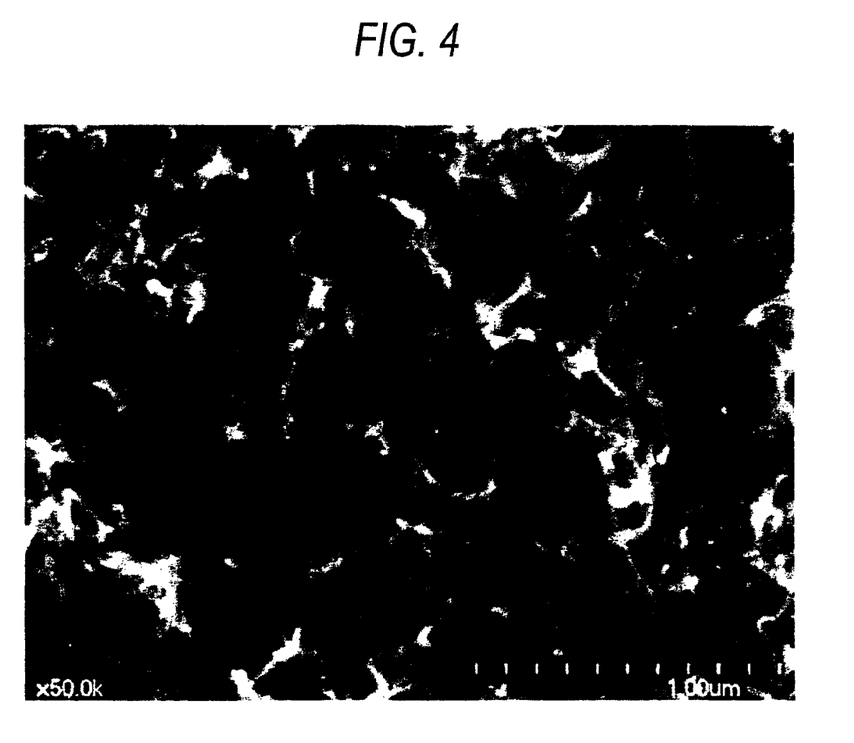
FIG. 4 is a drawing illustrating the SEM image of the composite material obtained in Example 7.
Figure 5:
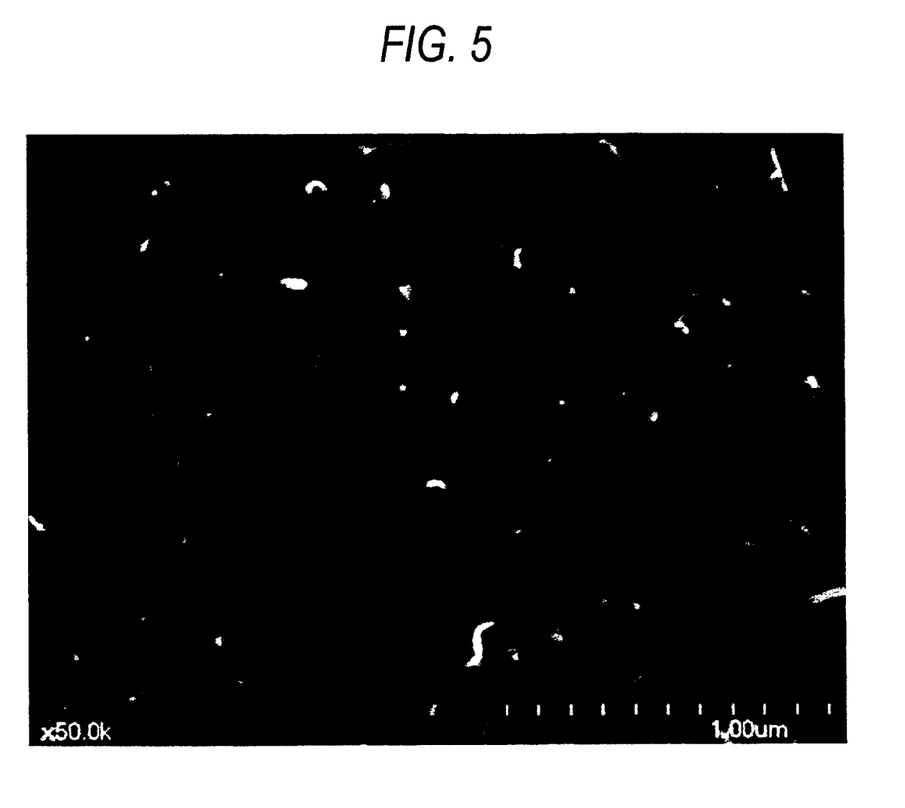
FIG. 5 is a drawing illustrating the SEM image of the composite material obtained in Example 8.
Figure 6:
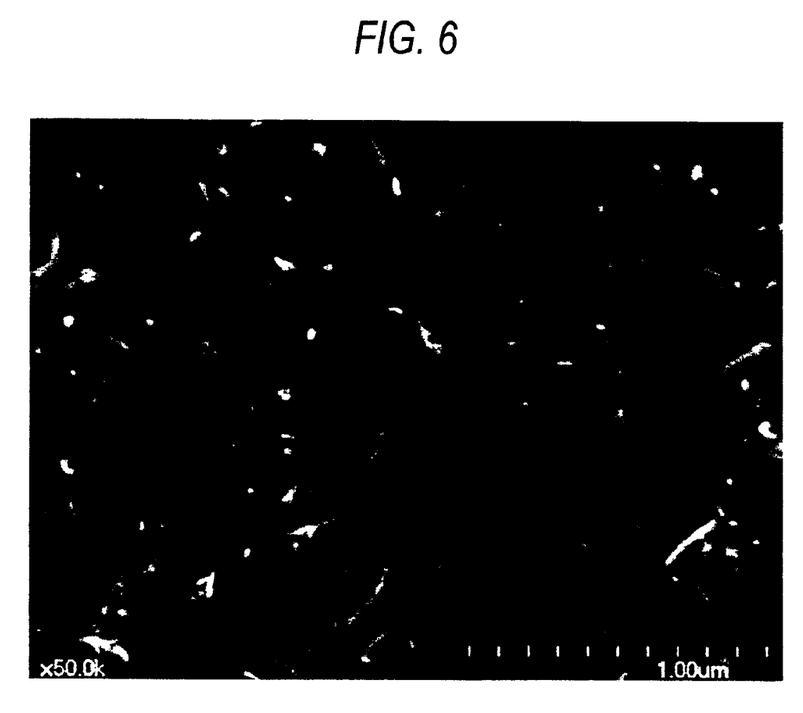
FIG. 6 is a drawing illustrating the SEM image of the composite material obtained in Example 9.

Furthermore, as Examples 7 to 9 SEM images (magnification of 50.0 k) of the tensile fracture surfaces of the crosslinked samples of the polymer substances being respective EPDM, natural rubber (NR) and nitrile rubber (NBR) are illustrated in FIGS. 4 to 6. The mixture consists of a carbon nanofiber 20 parts by weight charged into a polymer substance 100 parts by weight. Moreover, as a carbon nanofiber a multiwall nanotube having an average diameter of 13 nm manufactured by ILJIN Nanotech Co., Ltd. was used. In preparing the crosslinked samples in Examples 7 to 9, a polymer substance was kneaded with a carbon nanofiber by steps equivalent to the steps 1) to 5) in Examples 1 to 6. As a crosslinking agent, double-functional peroxide (2 parts by weight) was charged into the resulting mixture of the polymer substance and carbon nanofiber. The mixture was subjected to sheeting. Subsequently, the sheeted mixture having a thickness of 3 mm was press-molded at 175° C. for 20 minutes. From FIGS. 4 to 6 it is confirmed that the carbon nanofiber is more homogeneously dispersed using NR and NBR in Examples 8 and 9 compared with using EPDM in Example 7.

Figure 7:
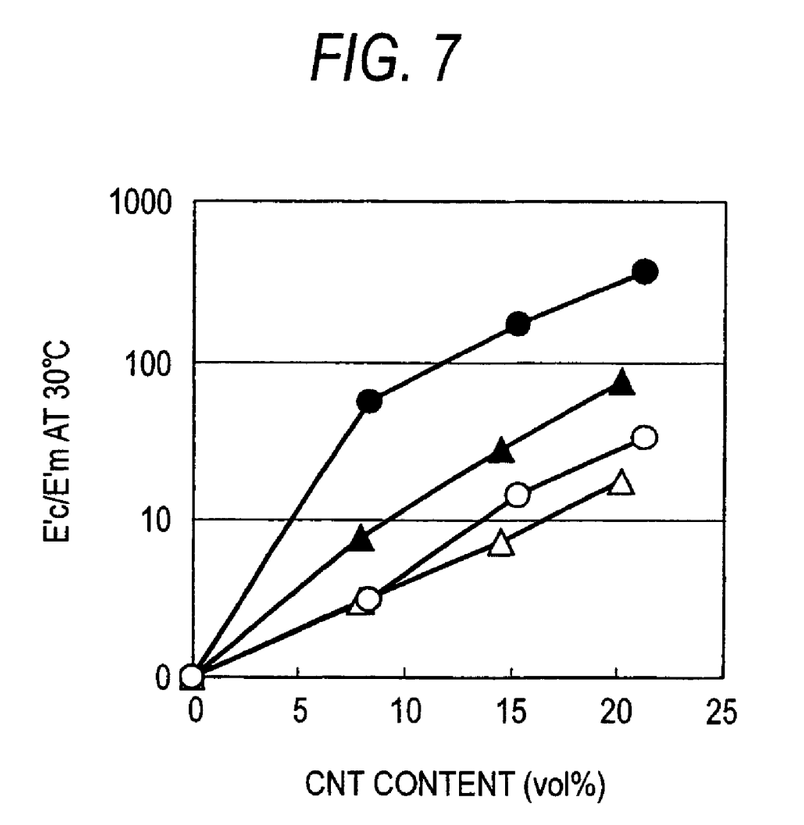
FIG. 7 is a graph illustrating the increase factor of the dynamic storage modulus in Examples 7 and 8.

The graph in FIG. 7 shows the increase factor (E'c/E'm) of the dynamic storage modulus (E') of the crosslinked samples in Examples 7 and 8. E'c is the dynamic storage modulus of a crosslinked sample, and E'm is the dynamic storage modulus of a elastomer (polymer substance) alone. With reference to FIG. 7, the black triangles show Example 7 (EPDM) and black circles show Example 8 (NR). For reference, an example of using a carbon nanofiber of 13 nm instead of a carbon nanofiber of 150 nm is shown by the symbols such as empty triangles (EPDM) and empty circles (NR) in FIG. 7. From FIG. 7 it is known that the increase factor of the dynamic storage modulus is greater in the carbon nanofiber of thin fibers than the carbon nanofiber of thick fibers. Furthermore, it is clearly understood from FIG. 7 that the increase factor of the dynamic storage modulus is greater where the matrix is NR compared with where the matrix is EPDM.

While the present invention has been described in detail and with reference to specific embodiments thereof, it will be apparent to one skilled in the art that various changes and modifications can be made therein without departing from the spirit and scope thereof.

This application is based on Japanese patent application Nos. 2003-105294 (filed Apr. 9, 2003), 2003-150164 (filed May 28, 2003) and 2003-309932 (filed Sep. 2, 2003), the contents thereof being herein incorporated by reference.

What is claimed is:

1. A carbon fiber composite material comprising an elastomer and a plurality of carbon nanofibers substantially uniformly dispersed in the elastomer, wherein:

the elastomer has an unsaturated bond or a group bonding with an active part of each carbon nanofibers;

the elastomer in the composite material is in its uncrosslinked form; and the composite material has a first spin-spin relaxation time ($T2n$) of 100 to 3,000 μsec and a second spin-spin relaxation time ($T2nn$) of being absent or 1,000 to 10,000 μsec, and a fraction (fnn) of components having the second spin-spin relaxation time of less than 0.2, as measured under conditions of an observing nucleus of $^1H$ at 150° C. by the Hahn-echo method using pulsed NMR technique.

2. The carbon fiber composite material according to claim 1, wherein the elastomer has a weight average molecular weight of 5,000 to 5,000,000.

3. The carbon fiber composite material according to claim 1, wherein the elastomer has, in at least one of its main chain, side chains and terminal chains, at least one member selected from the group consisting of a double bond, a triple bond, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

4. The carbon fiber composite material according to claim 1, wherein the elastomer in the composite material is one of natural rubber (NR) and nitrile rubber (NBR).

5. The carbon fiber composite material according to claim 1, wherein the elastomer in the composite material is in its uncrosslinked form and the composite material has a flow temperature higher than the inherent flowing temperature of the elastomer by 20° C. or more.

6. The carbon fiber composite material according to claim 1, wherein each carbon nanofiber has an average diameter of 0.5 to 500 nm.

7. A carbon fiber composite material comprising an elastomer and a plurality of carbon nanofibers substantially uniformly dispersed in the elastomer, wherein:

the elastomer has an unsaturated bond or a group bonding with a terminal radical of each carbon nanofibers;

the elastomer in the composite material is in its uncrosslinked form; and the composite material has a first spin-spin relaxation time ($T2n$) of 100 to 3,000 μsec and a second spin-spin relaxation time ($T2nn$) of being absent or 1,000 to 10,000 μsec, and a fraction (fnn) of components having the second spin-spin relaxation time of less than 0.2, as measured under conditions of an observing nucleus of $^1H$ at 150° C. by the Hahn-echo method using pulsed NMR technique.

8. The carbon fiber composite material according to claim 7, wherein the elastomer has a weight average molecular weight of 5,000 to 5,000,000.

9. The carbon fiber composite material according to claim 7, wherein the elastomer has, in at least one of its main chain, side chains and terminal chains, at least one member selected from the group consisting of a double bond, a triple bond, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

10. The carbon fiber composite material according to claim 7, wherein the elastomer in the composite material is one of natural rubber (NR) and nitrile rubber (NBR).

11. The carbon fiber composite material according to claim 7, wherein the elastomer in the composite material is in its uncrosslinked form and the composite material has a flow temperature higher than the inherent flowing temperature of the elastomer by 20° C. or more.

12. The carbon fiber composite material according to claim 7, wherein each carbon nanofiber has an average diameter of 0.5 to 500 nm.

13. A carbon fiber composite material comprising an elastomer and a plurality of carbon nanofibers substantially uniformly dispersed in the elastomer, wherein:

the elastomer has an unsaturated bond or a group bonding with an active part of each carbon nanofibers;

the elastomer in the composite material is in its crosslinked form; and the composite material has a first spin-spin relaxation time (T$2n$) of its of 100 to 2,000 μsec and a second spin-spin relaxation time (T$2nn$) of being absent or 1,000 to 10,000 μsec, and a fraction (fnn) of components having the second spin-spin relaxation time of less than 0.2, as measured under conditions of an observing nucleus of $^1$H at 150° C. by the Hahn-echo method using pulsed NMR technique.

14. A carbon fiber composite material comprising an elastomer and a plurality of carbon nanofibers substantially uniformly dispersed in the elastomer, wherein:

the elastomer has an unsaturated bond or a group bonding with a terminal radical of each carbon nanofibers;

the elastomer in the composite material is in its crosslinked form; and the composite material has a first spin-spin relaxation time (T$2n$) of its of 100 to 2,000 μsec and a second spin-spin relaxation time (T$2nn$) of being absent or 1,000 to 10,000 μsec, and a fraction (fnn) of components having the second spin-spin relaxation time of less than 0.2, as measured under conditions of an observing nucleus of $^1$H at 150° C. by the Hahn-echo method using pulsed NMR technique.

* * * * *